Dec. 3, 1929.  L. E. DE MOLE  1,737,573
CHANGING SIGN AND DISPLAY APPARATUS
Filed March 14, 1925  7 Sheets-Sheet 1

Inventor
L. E. De Mole

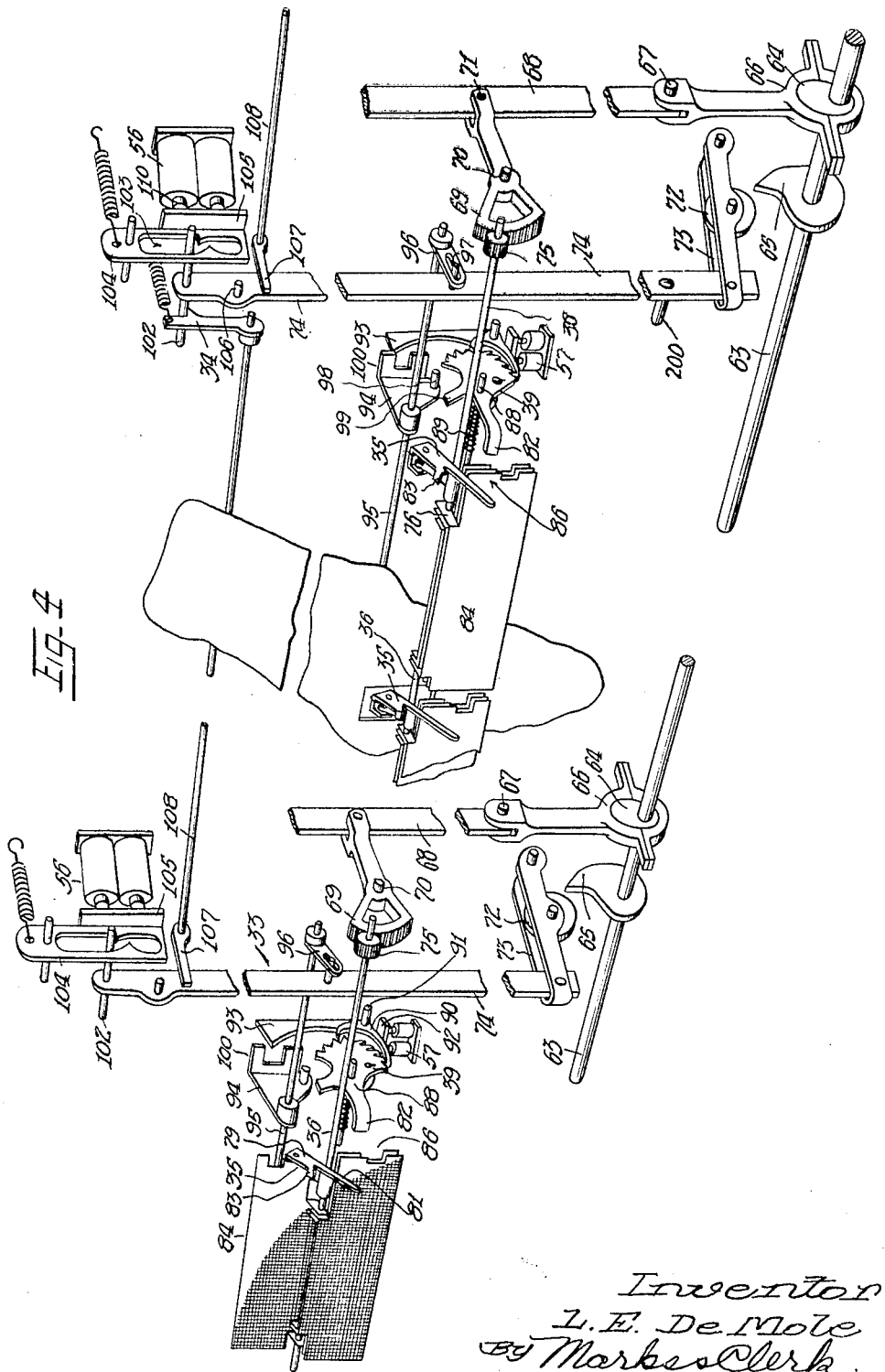

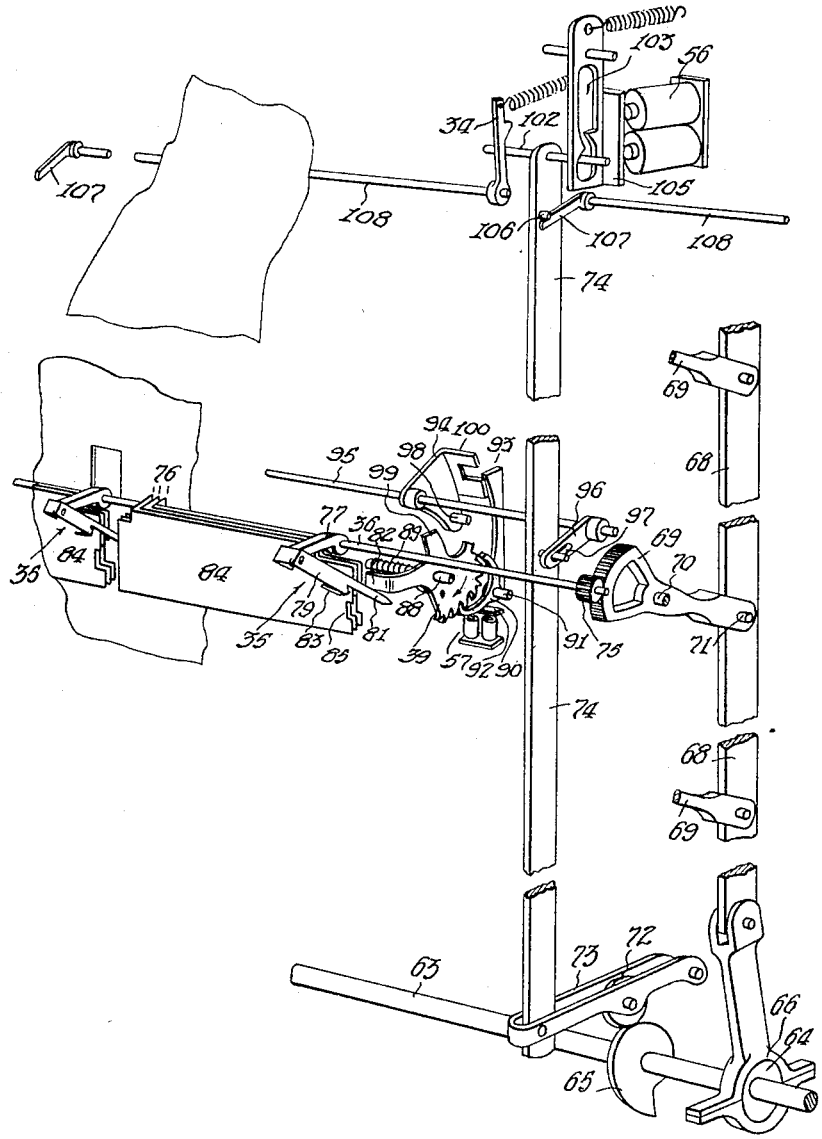

Dec. 3, 1929.                L. E. DE MOLE                1,737,573
                  CHANGING SIGN AND DISPLAY APPARATUS
                  Filed March 14, 1925      7 Sheets-Sheet 4
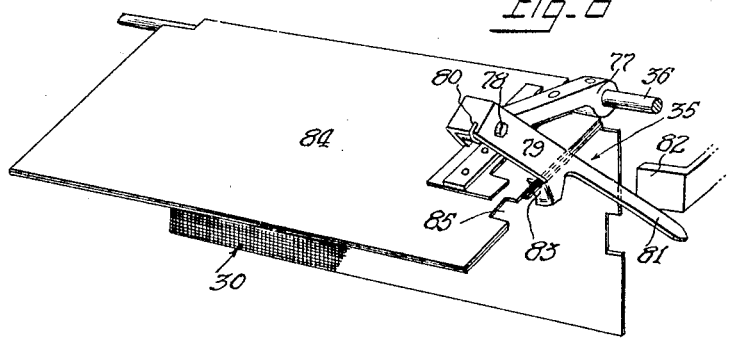
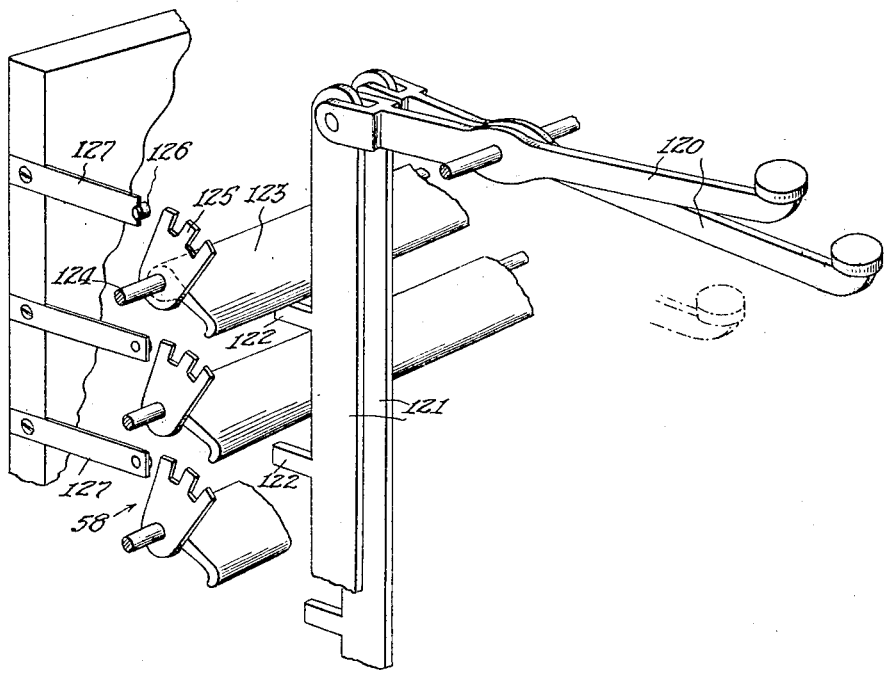
L. E. De Mole
      INVENTOR
By: Marks & Clerk
          Attys.

Dec. 3, 1929. L. E. DE MOLE 1,737,573
CHANGING SIGN AND DISPLAY APPARATUS
Filed March 14, 1925   7 Sheets-Sheet 5
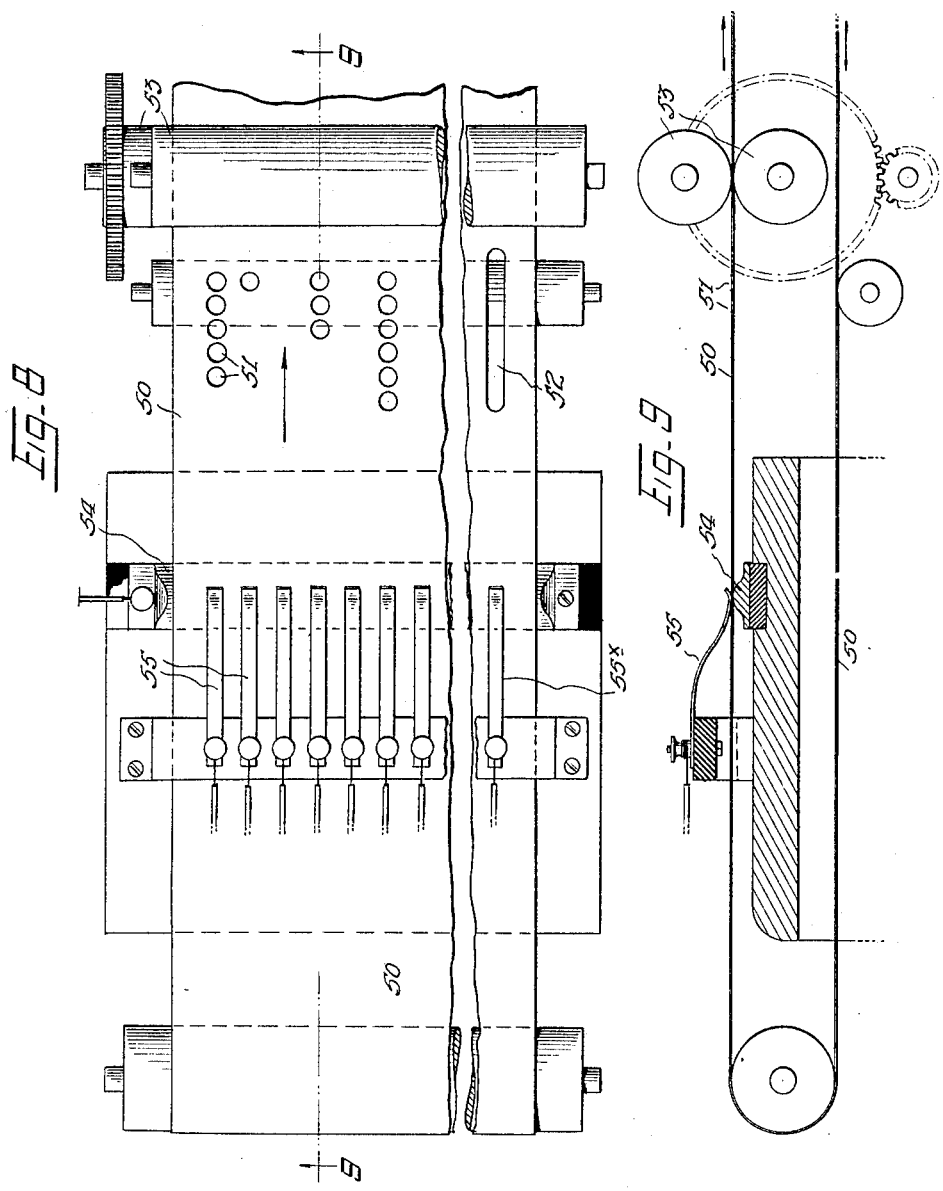

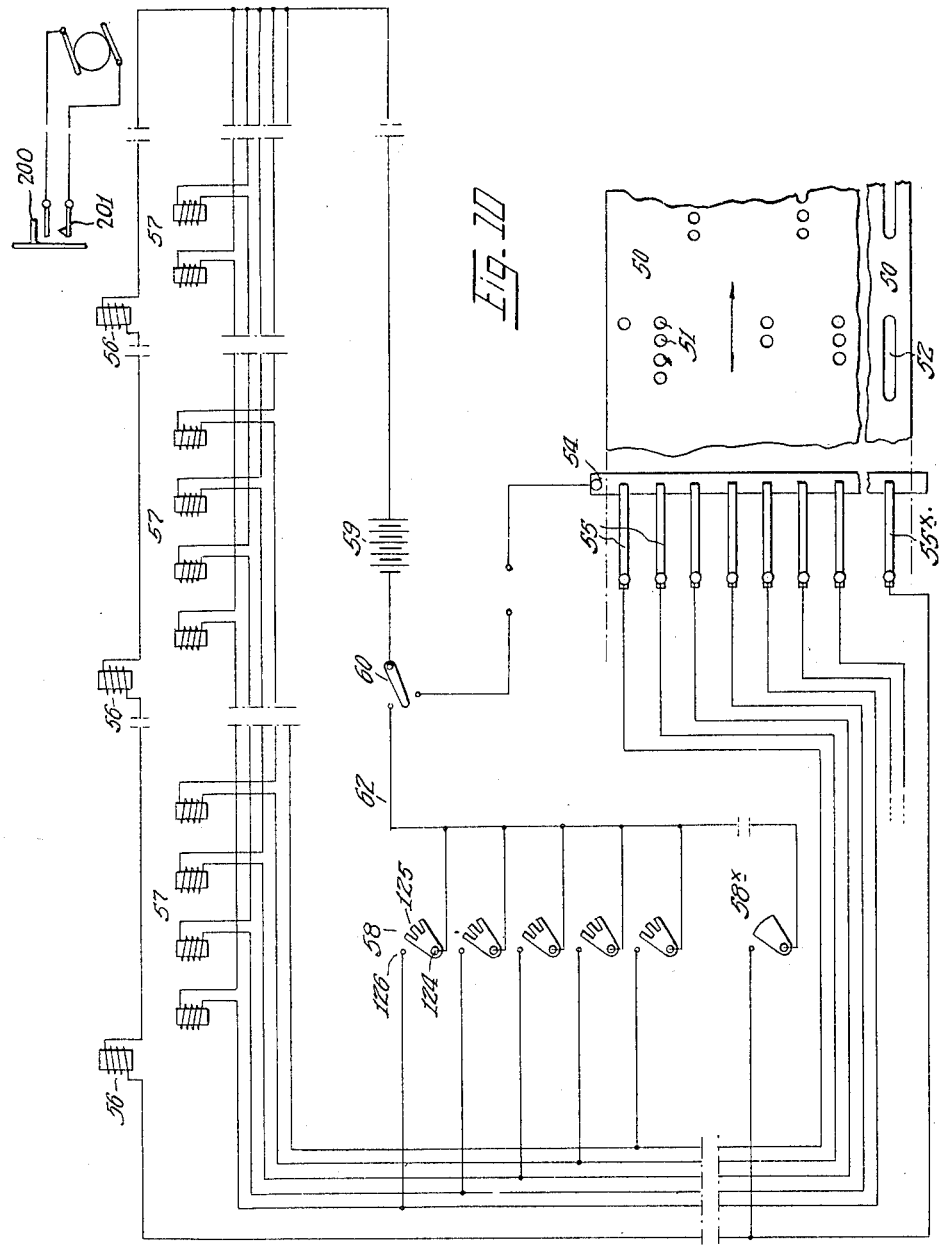

Dec. 3, 1929.  L. E. DE MOLE  1,737,573
CHANGING SIGN AND DISPLAY APPARATUS
Filed March 14, 1925   7 Sheets-Sheet 7

Patented Dec. 3, 1929

1,737,573

UNITED STATES PATENT OFFICE

LANCELOT ELDIN DE MOLE, OF CREMORNE, NEAR SYDNEY, NEW SOUTH WALES, AUSTRALIA

CHANGING SIGN AND DISPLAY APPARATUS

Application filed March 14, 1925, Serial No. 15,591, and in Australia June 17, 1924.

This invention relates to keyboard controlled apparatus for exhibiting signs and indicators for advertising, score indicating, and other visual signalling and display purposes. The invention has for its object to provide an improved apparatus in which by appropriately controlled changes of position of hinged shutters carrying appropriate markings, words or numbers or symbols may be built up or pictures may be constructed on the "block" system.

The present apparatus is effective for the production in rapid succession of alphabetical letters and figures and conventional indicators of perfect shape whereby great clarity in display and resulting facility for reading at a distance is obtained.

In the apparatus in which the present invention consists a display "board" carries an assembly of folding shutters or flaps which are painted on both sides on a "block" system—that is to say so that by folding some or all of them in different combinations, corresponding letters, figures, symbols, and pictorial or other designs may be produced. The whole surface of the board may be covered by the shutter system (actually only about one half the area of the board is occupied by the shutters when they are all folded back to blank position, each group of shutters is located next a blank field space over which the shutters are folded back) or "panels" containing an assembly of shutters may be disposed over the board in any desired arrangement, and such "panels" may be surrounded with other shutters, the groups of shutters in the panels being in this arrangement operable to produce changing letter signs whilst the shutters surrounding the panels are operable to produce a changing bordering or field. When the field of the board is more or less covered by the system of shutters, and the shutter fronts and backs and the board field spaces are painted on a "building block" system, line diagrams or pictorial designs may be formed by appropriately folding some or all of the shutters to produce the desired combinations by composition of the displayed block elements.

To facilitate explanation of the apparatus, the accompanying drawings illustrate the simplest arrangement, that is the arrangement in which two or more horizontal courses of letter panels are disposed at spaced distances apart on a board, for producing a letter sign. The apparatus used when the board is arranged for a full surface display is no different in structure or function from the apparatus used for the letter sign arrangement.

The shutters are superposed and groups of superposed shutters are located in checkerboard or other order to cover the designed field. The shutters in each group are individually foldable on pivotal supports, so that by folding them back or forth the obverse or reverse painted face respectively of each shutter may be displayed. The folding of the shutters in each group and their return to "blank" position is performed by a picker which is set by a selector to procure its engagement with one or more of the shutters with which it is associated, or to operate idly to leave the outermost shutter front face exposed, and the selector is set by operation of a manual keyboard or an automatic keyboard through electromagnetic mechanism. The pickers hold the placed shutters for the period of the display, and return them to blank position at the termination of each display period.

In order to limit the electrical wiring and control system of the apparatus to the fewest number of parts, the mechanisms of certain shutter groups are interlocked and all the similarly placed selectors serving those groups are operated through the same control circuit. This is effected by providing a locking device having a consecutive action— that is to say a locking device which functions to arrest operation of the selectors which belong to the several groups of shutters interlocked by it that they can come into operation only successively and not simultaneously, the locks for each group being freed only when a change has been made in the selectors of the preceding shutter group. When the selectors have been set they are again locked automatically by the same device, the selector or the next group in order being unlocked and relocked after setting, and so on.

In the accompanying drawings:—

Fig. 4 is a fragmentary perspective view showing in detail the shutter folding mechanism and the control mechanism associated therewith.

Fig. 5 is a fragmentary perspective similar to Fig. 4 showing the parts in a different position.

Fig. 6 is an enlarged perspective view of three shutters and cooperating parts.

Fig. 7 is a fragmentary perspective view of a manual keyboard device for setting the selectors and releasing the lock bar.

Fig. 8 is a plan view of the automatic device for setting the selectors and releasing the lock bar.

Fig. 9 is a side elevation of Fig. 8.

Fig. 10 is a diagrammatic plan of electric circuits including the manual device shown in Fig. 7 and the automatic device shown in Figs. 8 and 9.

Figure 1:
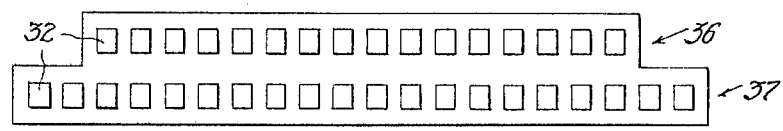
Fig. 1 is a semi-diagrammatic view of a two line sign.

Each line is constituted of a number of independent panels, and each of these panels is constituted of an assembly of groups of folding shutters. In practice, these shutters would be rectangular or nearly so in shape, but they might be of other shape. The shutters in each group or subdivision of each panel are superposed so that when the outermost shutter is folded over, its back face, together with the front face of the number two shutter are exposed, and the field space over which the number one shutter has been folded is covered. There are thirty five, more or less, groups of shutters in each panel. Thirty five groups of shutters offer great facility for the lay out of the painting of the shutters on the building block system, so that when the selected shutters are folded the panel as a whole offers a representation of a letter of the alphabet, or a figure, or a symbol. So long as a grouping of shutters is used which offers adequate facility for the production of the necessary characters by folding certain of the shutters to produce a composite result on the building block principle, the necessary condition is satisfied and it is not essential that a group of shutters as shown being five shutters in the horizontal line and seven in vertical arrangement, making thirty five in all need be adopted. Certain of the panels may be allocated for exhibiting signs or indicators or devices other than letters, figures, or symbols. In the arrangement illustrated in the drawings for the sake of simplicity three shutters only are shown in each group. In practice, however, a larger number of shutters are used in most cases in order to obtain facility for building up the representations to be displayed. In most cases in practice seven shutters would be used in most of the shutter groups. It would be undesirable to unduly increase the number of shutters in any one or more of the groups, though eight or nine shutters where necessary may be used without involving mechanical difficulties.

Figure 11:
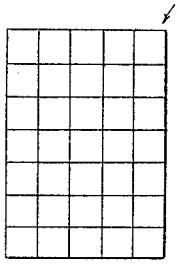
Figs. 11 to 20 are plan views showing a system of block painting of the shutter for the production of Roman letters and figures.

For the production of letters of other styles, or figures of other styles, the lay out of the block painting on the several shutters would be appropriately varied from that shown in Figs. 11–20. Fig. 11 shows all the shutters set in the blank position, and the face of the panel therefore displaying white, or any other background or blank color. The spaces on the panels intervening the groups of shutters are painted in the background color with which also the front faces of the outermost shutters are painted.

Figure 12:
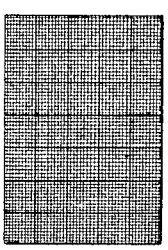
Figure 15:
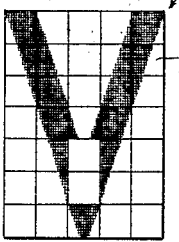
Figure 16:
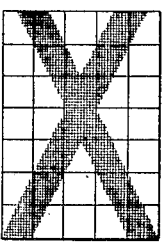
Figure 17:
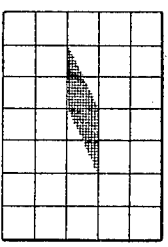
Figure 18:
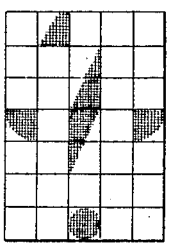
Figure 19:
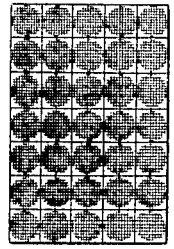
Figure 20:
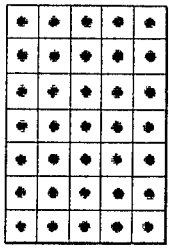

Fig. 12 shows the appearance of a sign panel containing thirtyfive groups of shutters, when all the number one shutters in a panel have been set to expose their reverse side and to expose the face of number two shutter. The face of the number two shutter in each group is painted black or other parti-color to contrast with the background color (Fig. 11). When, therefore, all the first shutters in a panel are lifted a full black field is exposed as shown in Fig. 12. When two shutters in each group in a panel are lifted, the marking displayed is that shown in Fig. 13. When three shutters are lifted, the marking displayed is that shown in Fig. 14, and so on; Fig. 15 showing a display when four shutters are lifted; Fig. 16 when five shutters are lifted; Fig. 17 when six shutters are lifted; and Fig. 18 when seven shutters are lifted. Markings for additional shutters are suggested in Figs. 19 and 20, which might be markings on eighth and ninth shutters respectively in each group. It will be noted that in practically all cases a change is effected in certain only of the displayed markings on the sections of a panel as successive shutters are moved. For instance, contrasting Figs. 13 and 14 it will be observed that nine of the shutters in corresponding positions display full white fields in both cases. By appropriately arranging the controlling devices to take advantage of the repetition of display which occurs in this way a certain saving in the number of shutters required to be fitted in some of the groups may be effected.

Figure 2:
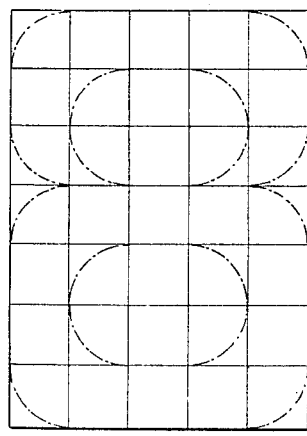
Fig. 2 is an enlarged front elevation of one of the panels forming part of the sign.
Figure 13:
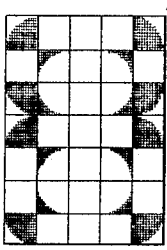
Figure 14:
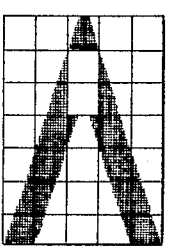

As shown in Fig. 2 the panel is constituted of thirty-five groups of shutters, each group containing seven shutters more or less. The figure 8 is indicated in dotted lines on this view. Referring to Fig. 13 the method of building up the figure 8 on the block building system may be followed. This particular figure is built up by lifting a shutter or shutters in each group to expose the "black" markings which asembled make up the complete shape. The white fields which must be filled in black to complete the figure are displayed as blacks by omitting the second shutter lift in those respective groups. Consequently, to build up the figure 8 one shutter is lifted in certain of the groups in the panel whilst two shutters are lifted in certain other groups in the panel. The lifting of the shutters in all of the thirty-five groups to produce this figure or any other figure or letter within the capacity of the sign is effected simultaneously in a single movement, the mechanism by which the picking up is effected being set by automatic or by manual means which will be described later, so that in a single movement none or any required number of shutters in each group in each panel are lifted simultaneously. The display on the panel as a whole is thus caused to change in a single movement, and symbols or built-up designs may be displayed and changed in the same manner with great rapidity. When, as is usually the case, the shutters are pivotally hung on a horizontal support they hang pendent by gravity, and as they are constructed of sheet metal their weight suffices to hold them with sufficient rigidity so that they are not flapped about by wind. The shutters are lifted from and are restored to the pendant position positively and are held positively while lifted, by the picker arms. At each change, therefore, every shutter is brought back to blank or idle position and the panel face appears over the whole of it, in uniform ground work color displaying no readable marking. The lay out of the markings of the respective shutters in the several groups in each panel enables the production of a very neat and symmetrical "fount" of letters and figures, together producing very clear signs.

Figure 3:
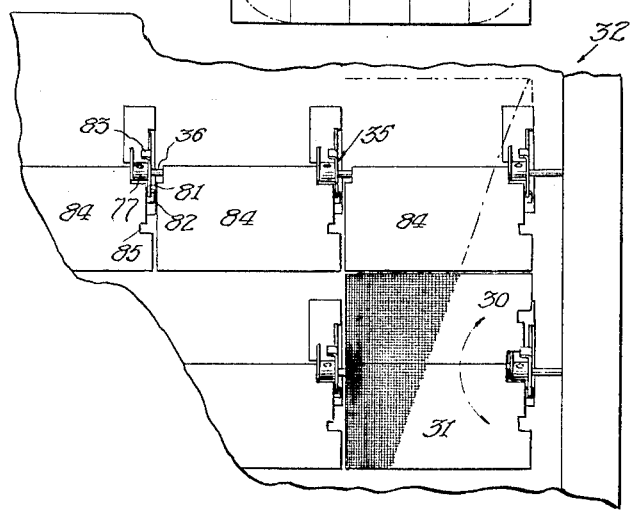
Fig. 3 is a fragmentary front elevation of a portion of one panel showing the shutter arrangement and marking.

Of the several shutter groups disclosed in Fig. 3 one shutter is shown lifted displaying the markings produced as a result of this lift, and all the other shutters pendent in their normal idle position. It will be noted on referring to the figure that when this shutter 30 is lifted so that its reverse side is displayed covering the panel background which it then overlies, the front of shutter 31, lying below it, is also exposed and the marking on the back of shutter 30 and on the front of shutter 31 match to form part of a letter or figure structure, the painting or marking on these shutters being indicated by cross-hatched lines. The group of shutters in which the shutters are set in this way are referred to by the bracketed reference numbers 30—31 in Fig. 15.

The left-hand portion of Fig. 4 shows one shutter of a panel which is located at the beginning of a horizontal series of panels, that is to say in the position 32 Fig. 1. The right-hand portion of this figure shows one and a portion of another set of shutters in any of the panels on the same row as panel 32. The first panel in each horizontal course of panels is unlocked electro-mechanically to permit of its selectors setting and whilst in all other panels the unlocking action is controlled electro-mechanically and also sequentially mechanically from the preceding panel mechanism. The complete mechanism of a panel is not shown in Fig. 4, but only sufficient of it to explain adequately the principle of construction, the arrangement, and the interlocking and functioning of the parts. In the right-hand portion of the figure all the shutters (three only are shown in each case in order to facilitate explanation) are shown at blank position; the picker selector is shown set at the end tooth of the detent and the automatic lock associated with it is shown engaged, in which position it will remain until thrown to released position by the retirement of the mechanical check 34, which occurs only when the selectors in the preceding panel (in horizontal line with it) have been set ready for the next display. In the left-hand portion of the figure one shutter is shown lifted, with the picker selector at the first detent (unset but ready for setting), and the lock is shown released to permit the selector to be operated. When the lock bar 33 descends, the selectors in this shutter group are all relocked. The shutter pickers 35 are carried on rock shafts 36, one rock shaft for each horizontal course of shutter groups in a panel. There are thus (in a 5 x 7 shutter group panel) seven rock shafts extending through each panel one for each line of shutter groups, and all of these rock shafts are rocked simultaneously by the gearing 69—75 which will be described later.

In Fig. 5 a shutter picker is shown descending to engage two shutters, the selector 39 being already set at the second detent to cause the picker 35 to engage two shutters. The selector detent is shown as in Fig. 4 with such a number of teeth, so that it can control the picker action to cause it to engage any required number of shutters to lift them in its rising movement.

50 represents a continuously moving sheet of insulating paper having several lines of punch holes 51 made in it; these punch holes corresponding with the impulses required to be transmitted to the electro-magnets 57 for the purpose of effecting the necessary changes in the selector adjustment. There is one line of perforations for each set of shutter groups. Thus, for instance, taking the case of a sign constructed as suggested in Fig. 1. That sign contains thirtysix panels each of which contains thirtyfive groups of shutters. Each group consisting of seven or any other required number of individual shutters. In that case the strip 50 would have thirtyfive lines of perforations, and that number of perforate lines would remain the same irrespective of the number of panels in the sign and also irrespective of the number of individual shutters in each shutter group. In addition to the lines of perforations 51 the paper strip 50 is also perforated with a long slot 52 in parallel with each set of perforations 51; these slots 52 control the circuits of the locking magnets by which sequential operation of the selectors in each panel is assured. The perforated paper strip 50 is drawn between rollers 53 over a group of contacts 54. A contact making spring 55 is set over each line of perforations 51 and 52. An electric circuit is completed through the contacts 54—55 whenever a perforation in the paper permits a spring 55 to touch a contact 54. The circuiting arrangement shown in Fig. 10 is diagrammatic only. The spring fingers 55×, corresponding structurally with the spring fingers 55, co-act with the long slots 52 to operate the locking magnets 56. The mechanism which is operated by these magnets will be described later.

The circuits respectively completed by the spring fingers 55 traverse the coils of the selector electromagnets 57 which occupy like positions in the respective panels; the circuits of these magnets may also be similarly completed through the alternative manual control arrangement 58 (see also Fig. 7). 59 is a battery or other source of current for operating the electro-magnet system. 60 is a change-over switch for connecting either the automatic operating means (Figs. 8 and 9) with the magnet system, or alternatively connecting the manual control system (see Fig. 7) with the magnet system.

When any one of the perforations 51 is passing between a spring finger 55 and a contact block 54, the switch 60 being closed in the automatic circuit, current flows through the windings of the corresponding electro-magnets 57. Similarly, when a circuit is closed by the spring finger 55× all the magnets 56 are energized. If the switch 60 be thrown over to connect the battery 59 into the manual control circuit 62, then similarly upon operation of any one of the manual controls a current is caused to pass through the winding of the related electro-magnets 57, and current is likewise caused to pass through the winding of the locking magnets 56 the appropriate manual contact maker 58 being closed simultaneously with the operation of any of the contact makers 58. The control arrangement, whether of the automatic operated tracker type or of the manual keyboard type, is operated through the same circuits and has the same effect on the electrical system of the electro-magnets 56 and 57 respectively, each of the electro-magnets 57 in circuit receiving one or more impulses at each complete operation of either the manual or automatic control, and each of the electro-magnets 56 receiving one impulse for each operation of any of the groups of magnets 57.

Referring to Figs. 4 and 5. 63 is a shaft which is geared up to an electric motor and is rotated once for each change in the sign as a whole. It is most convenient to fit one of these shafts for each horizontal line of panels, and all these shafts in the complete structure may be intergeared so that they will rotate in unison or in following order. For each panel served by it, the shaft 63 carries an eccentric 64 and a drop cam 65. The strap 66 which works on the eccentric 64 is pin connected at 67 to a vertical oscillating bar 68. 69 are segment racks mounted for movement on horizontal pins 70 and pin connected at 71 to one of the vertical oscillating bars 68. The cams 65 co-act with tappet rollers 72 carried in offset brackets 73 on the locking bar 74 which is mounted to permit it free movement in a vertical direction.

Each segment rack 69 meshes with a pinion 75 on a rock shaft 36; this shaft serves all the shutter groups in a horizontal line in one panel. Upon this shaft the several pickers 35 for these shutter groups are keyed, and upon it also all the shutters in said horizontal course of shutters are pendularly hung as indicated at 76, Fig. 4. When a picker 35 is not lifting or holding up any one or more shutters in the group in which it operates all the shutters in that group hang pendent as indicated in the right hand portion of Fig. 4, and as indicated also in Fig. 5. When the picker has been operated and is holding up a shutter, the position is as seen in the left hand portion of Fig. 4.

The detail construction of the picker needs to be understood before the method of operating it is described; this detail is best seen in Fig. 6. Upon the shaft 36 an arm 77 is keyed. The picker is hung by a pivot pin 78 on the outer end of the arm 77. A wire spring coiled around the pivot 78 operates to swing the picker finger 79 inwards towards the arm 77. The picker is constructed of bent sheet metal with an inset catch 83. 80 indicates the tail portion of the picker spring which is coiled around the pin 78. 81 is the end of the picker finger 79. It slides under the selector finger 82 which is a forward offset extension of the segmental detent 39. In one side edge of each shutter a notch 85 is cut; these notches are different in height for each shutter in the group; they come higher in the successive shutters from front to back; this is clearly seen not only in Fig. 6, where for simplicity sake only three shutters are shown, but it is also shown at 86, Fig. 4. Assuming that the shutters are hanging pendent, as seen in the right hand portion of Fig. 4, then if the picker arm 77 be swung down by the partial rotation of the shaft 36 the picker catch 83 will slide over the face of the foremost shutter and slip back through the notches 85 so that it will come up rearward of the shutters as seen in Fig. 6. The selector finger 82 determines the degree of the rise which is permissible to the picker; the spring 80 would, if not restrained, cause it to move up to its limit position so that it would engage all the shutters in the group, but when the selector finger 82 is positioned to limit its upward movement the picker can only engage certain of the shutters, that is to say those of them which its catch 83 comes behind. The catch necessarily misses the rearward shutters because it does not reach up to the top of them. Consequently, upon a reciprocation of the shaft 36 taking place the picker finger 79 is caused to slide downward over the front shutter and then through the notches 85 in the shutters taking behind none, one, or more of the shutters according to its selector control, and in the return movement lifting the so engaged shutters to the vertical position, leaving the dis-engaged shutters still hanging pendent. Fig. 6 indicates the position as it would be when the picker finger 39 is rising carrying two shutters with it and leaving one shutter pendent, the selector finger 82 being so positioned as to prevent the catch 83 from engaging the still pendent shutter. The position of the respective shutters at the end of the reciprocation of the picker finger is seen in the left-hand portion of Fig. 4. Reciprocating rotational movement is applied to the shaft 36 by the operation of the excentric 64 which applies an oscillating movement to the sector rack 69 and through it reciprocating rotary movement via the pinion 75 to the shaft 36. The pickers on the shaft 36 are thus caused to make a complete reciprocating movement downward and upward once in each rotation of the main shaft 63. The sign is displayed only whilst the pickers are in the uplifted position. As soon as the downward movement of the pickers commences, the uplifted shutters are brought down with the pickers to the blank position in which the background color is shown over the whole sign.

The picker selector fingers 82 are bent arms on the selector detent 39 which is mounted for rotation on a fixed horizontal spindle 88. 89 is an helical spring fixed at one end to the fixed spindle 88, and at the other end to the detent 39; this spring operates to move the detent in the direction indicated by the arrow in Fig. 5, thereby to bring the setting finger 82 to full throw. The detent teeth are engaged by a rocking escapement 90, this escapement is freely movable on the carrier pin 91, and it is rocked by the electro-magnet 57, the armature 92 of which is fixed to it. 93 are lock tails on the escapements; these lock tails co-act with the notched segment 100 on the rocking arm 94. The end of the spindle 95 which carries the arm 94 is armed with a crank arm 96. The crank arm 96 is loosely connected through the pin and slot arrangement 97 with the lock bar 74. On the lower part of the rocking arm 94 is an offset tappet 98; this tappet in the forward movement of the arm 94 engages the horn 99 on the selector 39, striking it forward and thus forcing down the selector finger 82, tensioning the spring 89, and bringing all the detent teeth past the escapement 90 to the terminal position which is shown in the right-hand portion of Fig. 4. When the selector finger 82 is in this position the pickers 35 are incapable of engaging any of the shutters to lift them, because the selector finger 82 is located so low that it forces down the tail 81 of the picker so as to bring the catch 83 of the picker below the top edge of the lowest notch 85 in the group. In this case the picker may move idly up and down, but it cannot lift any of the shutters. If, however, the escapement 90 has been operated to let go one or more of the selector detent teeth, the selector finger 82 rises a certain amount for each tooth movement, each such successive movement allowing the picker arm to rise sufficiently to permit its catch to engage one extra shutter so as to lift the same when making its upward movement.

The notch check device 100 of the lock member 94 coacts with the tail piece 93 of the escapement so as to lock the escapement against movement except during the setting and resetting periods, that is to say, during the setting of the selectors, and while the selectors are being reset to zero position at which times the notched portion of the part 100 is opposite the top end of the tail 93 (see left-hand portion Fig. 4). When this position is reached, the electromagnets 57 being energized, the escapements 90 will be reciprocated to allow one or more of the detent teeth to pass. Depending upon the number of impulses sent to the magnets 57 from the control device, the detents 39 are brought to certain positions to control the operation of the pickers for the making of the succeeding sign. The setting is thus effected for each sign whilst the preceding sign is being exhibited, but the change over does not take place until the vertical oscillating bar 68 makes a movement to send the pickers down, thus to restore the sign to blank, and in the return movement to lift the pickers, and in this lifting movement to raise the shutters necessary for producing the following sign.

The locking movement is effected by the operation of the vertical oscillating bar 74, the movements of which are controlled by the action of the drop cam 65; this cam is so shaped that the bar 74 is not moved during the downward movement of the oscillating bar 68 which controls the picker action, nor until the shutters have been partially lifted by the picker action. When the bar 74 is lifted, it is engaged by the mechanical trip 34 which takes under the cross arm 102; this cross arm also passes through the latch slot 103 in the pendent rocker 104 which carries the armature 105 of the magnet 56. The tappet 106 on the bar 74 makes contact in the downward movement of the bar 74 with the arm 107 on the release spindle 108. The release spindles 108 serially unlock the bars 74 in each group of shutters in a panel. The check 34 is not used in the assembly of the first group of shutters in each horizontal line, but it is used in the second, and succeeding group assemblies in line. When the bar 74 in the first group drops, the dropping being effected by means hereinafter described, the spindle 108 connecting it with the number two group releases the check 34 which has been holding up the cross arm 102, and so allows the bar 74 to drop. It drops, however, only a short distance onto the pawl check in the slot 103, and it is there held until the magnet 56 is energized. It then falls on to a second pawl check in the slot 103 which holds it until the magnet 56 is de-energized. When this magnet is energized and deenergized and its armature 105 consequently reciprocated, the pawl check in the slot 103 releases the cross arm 102 and the lock bar 74 is then free to drop, the horn of the cam 65 being at this time cleared from below the tappet roller 72. In the dropping motion of the lock bar 74, the pin 97 acting on the arm 96 on the spindle 95 rocks that spindle so as to move the locking member 94 upward. In this position the tail 93 of the escapement 90 is locked (see Fig. 5). 110 is a spring which functions to move the armature 105 outward from the magnets 56. In Fig. 10, 201 represents a switch in the circuit of the electric motor by which the shaft 63 is driven. This switch is closed by a tappet 200 on the lock bar 74 which is associated with the last panel in the horizontal line of panels. When that bar 74 falls consequent on the energization of the end relay 56 and the release movement of the catch 34, the motor switch 200 is closed and the shaft 63 is rotated, whereupon through the eccentrics 64 and segment racks 69—75 oscillating movement is applied to the shafts 36, and to the pickers.

In this oscillatory movement the raised shutters are returned to their idle position and a new combination of shutters is lifted by the pickers in accordance with the setting of the several selectors. When the cams 65 move into engagement with the rollers 72 they raise the lock bars into the position shown in Fig. 4, and the motor switch 200 is opened.

During the ensuing period whilst the shutters are thus held raised the selectors 39 are reset in sequence by the impulses transmitted to the magnets 57, when the switches 55 make contact with the bar 54 through the perforations 51 in the continuously moving strip 50, the locking magnets 56 are energized sequentially when switches 55$^x$ make contact with the bar 54 through the respective slots 52 in the paper strip 50. The resetting of the selectors to the zero position is effected in the upward movement of the oscillating bar 74, in which movement the tappets 98 are caused to strike the horns 99 of the selectors and move their detent edges past the escapements 90 so as to bring them to the extreme position. As shown in Fig. 5, the escapement has been operated twice to let go two teeth of the detent and thus to set the selector so that the picker on being operated will engage two shutters and lift them together.

The operation of the manual control which is alternative to the automatic control (Fig. 10) will be best understood on reference to Fig. 7. 120 are keys in a keyboard, each key representing a specific letter, figure, or symbol. Each key has pendent from it a lift bar 121, and each lift bar is armed with offset fingers 122; these offset fingers are respectively engageable with wings 123 which function as arms, they are keyed to rocker spindles 124 and on each of these rocker spindles a contact brush 125 is fixed; these contact brushes coact respectively with contact studs 126 on circuit terminals 127. It will be understood that if one of the wings 123 be lifted so as to cause a single contact between one of the members 125 and a stud 126 one impulse will be sent to the magnets 57 in circuit with the connection 127, whilst if the movement be continued so that two or more contacts, as the case may be, are made successively, the magnets 57 will receive two or more impulses, and so on for any larger number. As the movement of the brushes 125 is a reciprocating movement make and break at the contact stud occurs in both the forward and backward movements of any brush which has been moved past the contact. If, for instance, the sign contains seven shutters in each group, then there would be four contact brushes 175 on each of the contact members keyed to the spindle 124. There is one of these contact devices provided for each series of magnets 57 in the system, and the lifting fingers 122 are so positioned that when the key 120 which carries the bar 121 on which they are formed is operated the appropriate number of makes and breaks in the circuit through the respective terminals 127 will be effected, and the corresponding armature magnets 57 will be actuated in correspondence so as to let go one or more teeth in the respective detents governed by them, thus to position the selectors so that the pickers will in their next operation lift the proper number of shutters to produce the desired sign. With this device a single operation thus suffices to produce, by the operation of the means shown in Fig. 7, the proper number of make and break impulses to set all the sign elements in the controlled group which is for the time being in process of being set, for the production of any desired sign called for by the striking of the particular key allocated to it.

What I claim as my invention and desire to secure by Letters Patent is:—

1. A changing sign consisting of a plurality of sections each section including a plurality of foldable shutters superposed on each other, marks on the several shutters adapted to produce a variety of complete display shapes when they are exposed in appropriate combinations, setting means including selectors and pickers for operating said shutters, electro-magnetic apparatus, sequentially operating checks, means dependent upon the operation of said sequentially operating checks for interlocking the setting means whereby said means will be operative through said electromagnetic apparatus in each of the several sections for changing the shutter arrangement in each section consecutively.

2. In a display apparatus, a plurality of subdivided panels, each panel including a group of shutters in each panel subdivision, a picker arranged for engaging any number of said shutters and lifting and holding the same in reverse position, a picker selector device arranged to position the picker for engagement with any required number of shutters, and escapement, a one-way spring returned detent, an electromagnet, and a keyboard controlling said electromagnet, said picker selector being positioned by the operation of said escapement acting through said one-way spring returned detent, and said escapement operated to release detent teeth to effect the movement of the selector by means of said electromagnet controlled through said keyboard.

3. A movable shutter sign including panels, each panel including a plurality of groups of pendent notched shutters adapted to be folded upwardly, a selector device, a picker associated with each shutter group, said picker including an oscillating finger adapted at each oscillation to swing through the notches in the shutters, and to be positioned by said selector device to set it to engage behind any required number of shutters.

4. An apparatus according to claim 3, including a locking device adapted to hold the escapement against movement at all times except during the setting and the re-setting periods, and to permit movement of the escapement at that time to effect adjustment of the picker selector to control the picker operation in the next movement of the picker.

In testimony whereof I affix my signature.
LANCELOT ELDIN DE MOLE.